US008876486B2

(12) United States Patent
Tosello

(10) Patent No.: US 8,876,486 B2
(45) Date of Patent: Nov. 4, 2014

(54) MARINE WIND TURBINE HAVING A PYLON VERTICALLY ADJUSTED BY SETTING

(75) Inventor: André Tosello, Chatenay-Malabry (FR)

(73) Assignee: Saipem S.A., Montigny le Bretonneux (FR)

( * ) Notice: Subject to any disclaimer, the term of this patent is extended or adjusted under 35 U.S.C. 154(b) by 482 days.

(21) Appl. No.: 13/384,078

(22) PCT Filed: Jun. 18, 2010

(86) PCT No.: PCT/FR2010/051222
§ 371 (c)(1),
(2), (4) Date: Jan. 13, 2012

(87) PCT Pub. No.: WO2011/007065
PCT Pub. Date: Jan. 20, 2011

(65) Prior Publication Data
US 2012/0114484 A1 May 10, 2012

(30) Foreign Application Priority Data

Jul. 15, 2009 (FR) ...................... 09 54882

(51) Int. Cl.
| | |
|---|---|
| *E04H 12/18* | (2006.01) |
| *E02D 27/42* | (2006.01) |
| *F03D 11/04* | (2006.01) |
| *E02D 27/52* | (2006.01) |
| *E04H 12/08* | (2006.01) |

(52) U.S. Cl.
CPC .............. *F03D 11/045* (2013.01); *E02D 27/42* (2013.01); *Y02E 10/727* (2013.01); *F05B 2240/97* (2013.01); *E02D 27/52* (2013.01); *F05B 2240/95* (2013.01); *E04H 12/085* (2013.01)
USPC ........................................ 416/246

(58) Field of Classification Search
CPC ....... F03D 11/045; E02D 27/42; E02D 27/52; E04H 12/085; Y02E 10/727; F05B 240/95; F05B 2240/97
USPC ................... 415/3.1, 4.1, 905, 906, 907, 908; 416/244 R; 52/97, 296, 741.14
See application file for complete search history.

(56) References Cited

U.S. PATENT DOCUMENTS

| | | | | |
|---|---|---|---|---|
| 3,839,872 | A | * | 10/1974 | Loire ............................ 405/225 |
| 4,406,094 | A | * | 9/1983 | Hempel et al. ................... 52/40 |
| 7,877,933 | B2 | * | 2/2011 | Watchorn ........................ 52/40 |

(Continued)

FOREIGN PATENT DOCUMENTS

CH          241601          3/1946
(Continued)

OTHER PUBLICATIONS

International Search Report dated Nov. 2, 2010.

*Primary Examiner* — Edward Look
*Assistant Examiner* — Eldon Brockman
(74) *Attorney, Agent, or Firm* — Cozen O'Connor

(57) ABSTRACT

An off-shore wind turbine with a base supporting a pylon and a wind engine, the wind turbine being characterized in that the said base includes a tubular cavity, a bottom portion of said pylon being fixed in embedded manner inside said tubular cavity using a device that enables the angle of inclination of the axis (ZZ') of the pylon to be adjusted relative to the axis $(Z_1Z'_1)$ of the tubular cavity; and the adjustment device includes independent chocking mechanism interposed between the pylon bottom portion and the tubular cavity; and a centering mechanism secured to the pylon bottom portion and/or to the tubular cavity, the centering mechanism being situated inside the tubular cavity below at least some of the chocking mechanism and suitable for holding the point of intersection of the axis (ZZ') of the pylon bottom portion with the axis $(Z_1Z'_1)$ of the tubular cavity in a fixed position.

15 Claims, 5 Drawing Sheets

(56) References Cited

U.S. PATENT DOCUMENTS

2008/0056830 A1* 3/2008 Depardon et al. ............ 405/244
2008/0056906 A1* 3/2008 Gray et al. ................ 416/244 R
2009/0307998 A1* 12/2009 Zavitz et al. ................... 52/152

FOREIGN PATENT DOCUMENTS

| GB | 2394498 | 4/2004 |
|----|---------|--------|
| GB | 2451191 | 1/2009 |
| WO | WO2004/015207 | 2/2004 |

* cited by examiner

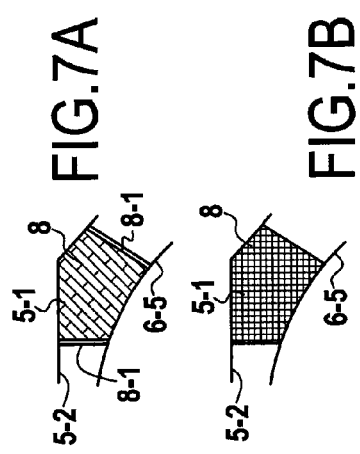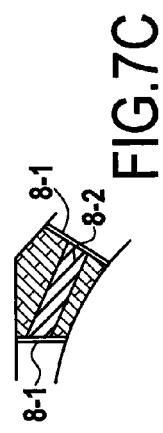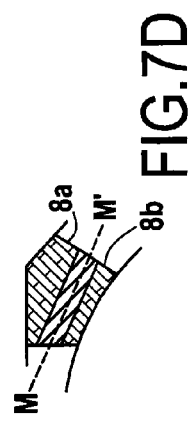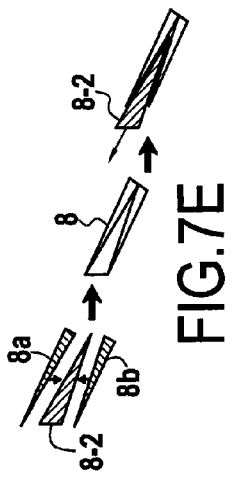
FIG.7A FIG.7B FIG.7C FIG.7D FIG.7E
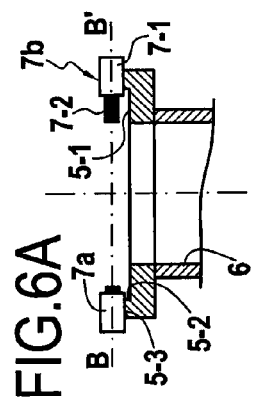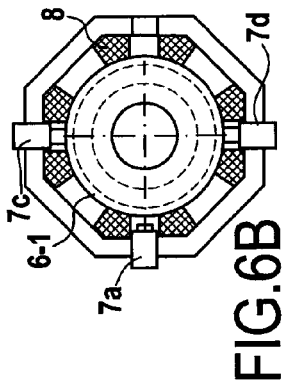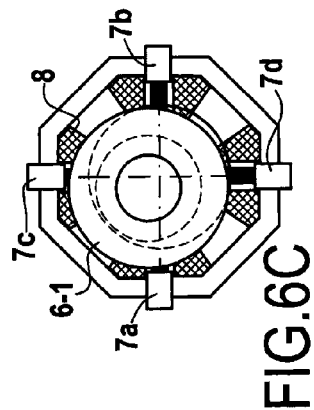
FIG.6A FIG.6B FIG.6C
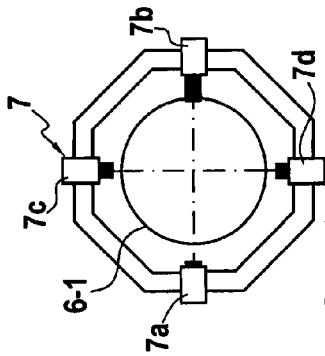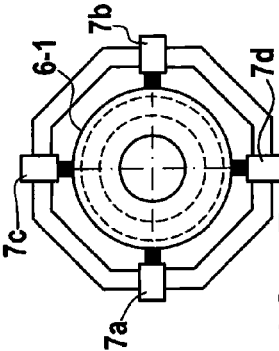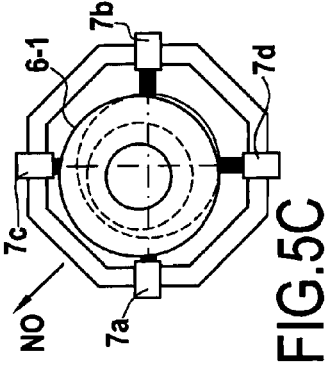
FIG.5A FIG.5B FIG.5C

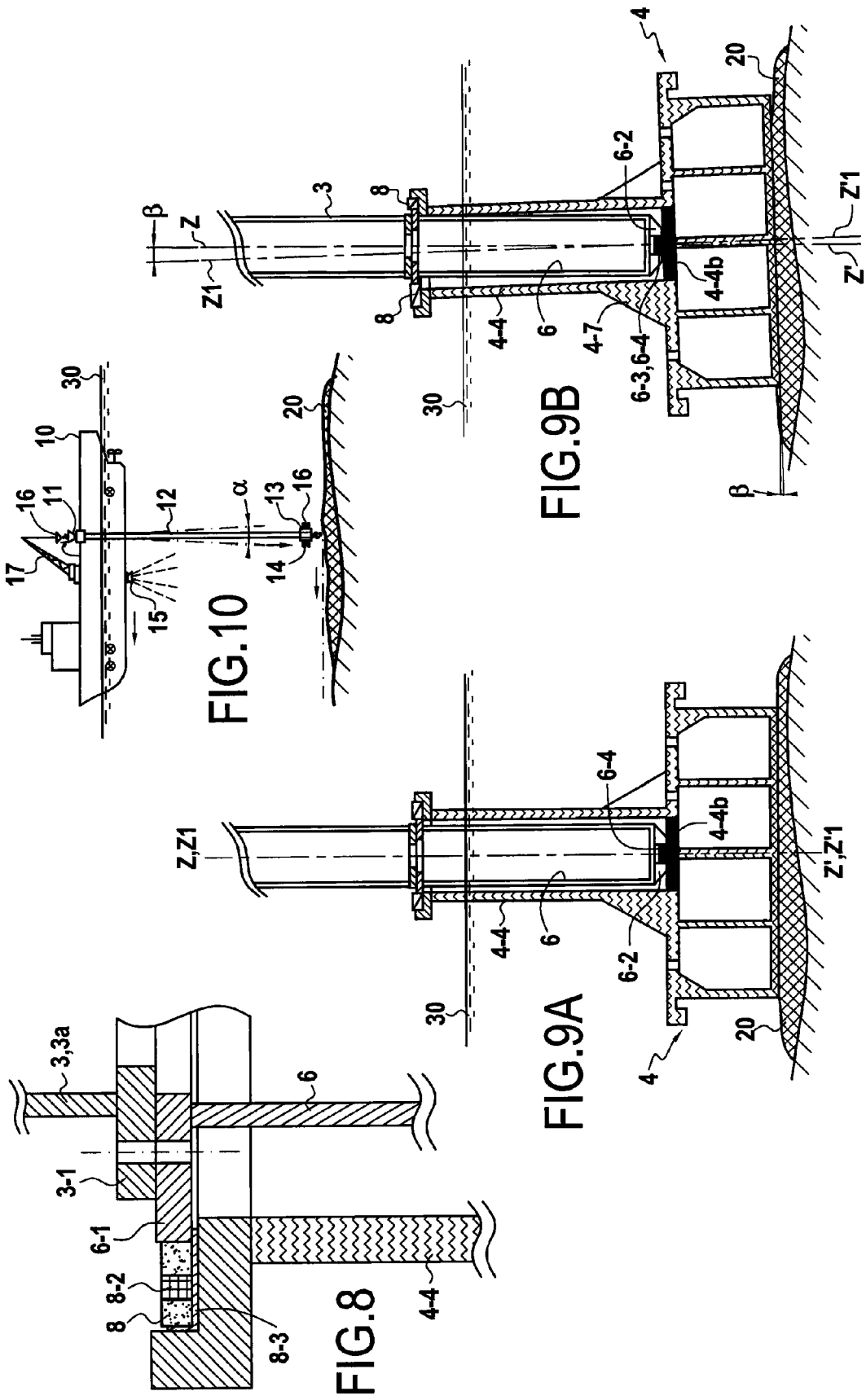

US 8,876,486 B2

MARINE WIND TURBINE HAVING A PYLON VERTICALLY ADJUSTED BY SETTING

PRIORITY CLAIM

This is a U.S. national stage of application No. PCT/FR2010/051222, filed on Jun. 18, 2010. Priority is claimed on the following application: French Application No.: 0954882 filed on Jul. 15, 2009, the content of which is/are incorporated here by reference.

FIELD OF THE INVENTION

The present invention relates to wind turbines installed off shore, in particular out at sea.

More particularly, the technical field of the invention is that of fabricating, transporting, and installing wind turbines for producing electricity, more particularly off-shore wind turbines of very large capacity that are designed to be installed at sea, more particularly away from coasts and in large numbers in order to form wind-turbine fields.

BACKGROUND OF THE INVENTION

Although terrestrial wind engines have been built over the last few centuries, building wind turbines at sea is much more recent.

A modern wind turbine, whether for use on land or off shore, generally comprises a horizontal axis engine having a plurality of blades and an electricity generator coupled to the engine, both of them being fastened to the top end of a vertically elongate support such as a mast or pylon.

In order to reduce the cost of wind-generated energy and increase the efficiency of generators, ever more powerful generators are being fabricated that are installed in grouped manner so as to form a wind-turbine farm or field.

Increasing the power of a wind-turbine generator involves also increasing its weight and the height of the structure that supports it.

For economic reasons, it is necessary to implement wind turbines that are ever more powerful and thus of ever greater dimensions, and in particular of ever greater heights. Similarly, such wind turbines are being installed at ever greater distances from the shore and therefore in ever greater depths.

The invention applies particularly, i.e. in non-limiting manner, to wind turbines having a generator of power lying in the range 100 kilowatts (kW) to 10 megawatts (MW), the weight of such a generator possibly reaching or exceeding 300 (metric) tonnes (t) or 500 t; the length of a pylon supporting the generator may be of the order of 50 meters (m) to 100 m, and the weight of the pylon may lie in the range 100 t to 500 t.

It can thus be understood that constructing such wind turbines and installing them at sea presents great difficulties. Various solutions have been proposed for constructing and installing off-shore wind turbines.

Off-shore wind turbines are described for example in WO 01/34977 and WO 03/004870.

Wind turbines installed at sea are generally assembled on site after previously creating a foundation constituted by a pile having a diameter of several meters that is driven into the ground, its top end being provided with a flange to which an identical matching flange secured to the pylon of the wind turbine is bolted in order to ensure the assembly is fixed in the bottom in embedded manner.

Another solution consists in using a tripod resting on the ground and anchored thereto via piles driven through the base of said tripod and cemented in order to ensure that the assembly is rigid.

Another solution consists in placing a gravity-base type structure so that it rests on the sea bottom and provides anchoring as a result of its own weight, with a flange being secured to the top thereof for receiving the wind turbine that is fitted with an identical matching flange.

Under all circumstances, the fixing of the bottom end of the pylon to the base represents a point of weakness for the wind turbine. Furthermore, it is guaranteed that the wind turbine is vertical only when the plane of the flange secured to the base is accurately horizontal, i.e. when its axis is accurately vertical. Unfortunately, there is a problem of positioning the axis ZZ' of the pylon vertically and of keeping it in the vertical position throughout the lifetime of the installation, as a result of differential compaction of the ground or of the stone covering made on the sea bottom and on which the pylon foundation or base is placed or anchored. The pylon needs to be accurately vertical so that the wind turbine operates properly throughout its lifetime, which may reach or exceed 20 to 25 years.

In general, verticality is adjusted via the flanges used for fastening the bottom end of the pylon to the base. Nevertheless, it is not simple to adjust verticality in this way and the adjustment must be extremely rigid; furthermore, it is not possible to adjust verticality very finely so as to ensure that the final verticality of the wind turbine is accurate.

In WO 2004/015207 and GB 2 394 498, systems are described for fixing and adjusting the verticality of a wind turbine pylon resting on a base on the sea bottom. However the means described do not enable the adjustment of the angle of inclination of the wind turbine pylon to be modified easily over time, and the means for fixing the pylon to the base are not sufficiently reliable in terms of accuracy and rigidity. Once the angle of inclination has been adjusted, the tubular cavity in which the bottom end of the pylon is embedded is subjected to final cementing, which tubular cavity is fully immersed.

Thus, the problem to be solved is that of making a wind turbine in which the rigidity of the embedded fixing of the pylon to the base is improved.

Another problem is to make a device for adjusting the verticality of a wind turbine pylon that is both extremely rigid and also capable of enabling said verticality to be adjusted very accurately, while being simple to operate and inexpensive to implement.

Another problem to be solved is to be able to readjust the verticality of a wind turbine during its operating lifetime, after differential compaction has occurred in the ground, where such compaction leads to the base taking up an angle of inclination relative to its theoretically horizontal position, and thus to the wind turbine pylon taking an angle of inclination relative to its theoretically vertical position, thereby running the risk in the long term of severe mechanical damage to the turret that supports the rotor and the generator of the wind engine.

SUMMARY OF THE INVENTION

To do this, the present invention provides an off-shore wind turbine resting on the sea bottom, the wind turbine comprising:

a base having a bottom bearing surface bearing against the ground of the sea bottom; and a pylon supported by said base, the bottom end of the pylon preferably being fixed in embedded manner in said base; and a wind engine supported by said pylon at its top end and comprising a rotary shaft of horizontal axis driven in rotation by an engine and supporting a plurality of blades with said wind engine being coupled to an electricity generator, the generator preferably likewise being supported by said pylon at its top end; and said base includes a tubular cavity of axis $Z_1Z'_1$ that is preferably perpendicular to said bottom bearing surface of the base, a bottom portion of said pylon being fixed inside said tubular cavity, the fixing being performed by means of a device for adjusting the angle of inclination of the axis ZZ' of said pylon to be adjusted relative to the axis $Z_1Z'_1$ of said tubular cavity;

the wind turbine being characterized in that said device for adjusting the angle of inclination of said pylon in said base comprises:

a) independent chocking means interposed between said pylon bottom portion and said tubular cavity at the level of the top opening of said tubular cavity projecting above sea level; and b) centering means secured to said pylon bottom portion and to said tubular cavity, said centering means being situated inside said tubular cavity beneath said chocking means, and said centering means being suitable for holding the point of intersection between the axis ZZ' of said pylon bottom portion and the axis $Z_1Z'_1$ of said tubular cavity in a fixed position below said top opening of the tubular cavity, preferably at the bottom of said tubular cavity.

The device of the present invention for fixing and adjusting verticality enable the pylon to be fixed by embedding in a manner that is mechanically reliable and rigid for an installation lifetime of at least 20 years. Such a device for adjusting verticality makes it possible to adjust the final verticality of the wind turbine pylon easily and in very fine and accurate manner during the lifetime of the installation, by modifying the chocks from the surface.

The term "independent chocking means" is used to mean that the chocking means are not secured to said bottom portion of the pylon, nor to said tubular cavity. It can be understood that because said chocking means are independent, said chocking means can be made in situ so as to occupy the space between the tubular cavity and the bottom portion of the pylon and to do so in reversible manner, possibly with variations to the dimensions of the spaces amongst the different positions around said bottom portion of the pylon, thereby enabling the axis ZZ' of said pylon bottom portion to have an angle of inclination relative to the axis $Z_1Z'_1$ of said tubular cavity that is adjustable by forming an angle at the apex corresponding to said point of intersection between the axis ZZ' of said bottom portion of the pylon and the axis $Z_1Z'_1$ of said tubular cavity.

It can be understood that the value of the angle at the apex $2\times\beta$ of the cone that can be described by inclining the axis ZZ' of said bottom portion of the pylon relative to the axis $Z_1Z'_1$ of said tubular cavity in which said pylon bottom portion is embedded depends on:

the difference in diameter between the diameter of the outside wall of said pylon bottom portion and the diameter of the inside wall of said tubular cavity at the top opening of said tubular cavity; and the height between said top opening of said tubular cavity and said point of intersection between the axis ZZ' of said bottom portion of the pylon and the axis $Z_1Z'_1$ of said tubular cavity.

Said tubular cavity forms a well or socket that rises above said bottom structure of said base.

It can be understood that the co-operation between said centering peg and said inside orifice constitutes a stationary hinge point that enables the bottom portion of the pylon to adopt an angle of inclination having a half-angle at the apex $\beta$ that corresponds to the maximum possible angle of inclination of said pylon bottom portion inside said tubular cavity.

The wind turbine of the invention enables the verticality of its pylon to be adjusted in the event of differential compaction occurring on the sea bottom and leading to the base taking up an angle of inclination, and thus leading to the pylon taking up an angle of inclination relative to its initial vertical position.

According to the present invention, it is possible to readjust the chocking easily during the lifetime of the installation since the chocking means are independent, being interposed in the top opening of the tubular cavity of the base and being easily accessible since they are located above sea level.

Furthermore, because of the distance between the chocking points and the bottom centering and bearing point corresponding to the height of the tubular cavity and because the tubular cavity extends over a height that is greater than in the prior art, since the top end of the tubular cavity is above sea level, the structures constituting the chocking means need to take up forces that are relatively smaller.

The embodiment of the invention is thus doubly advantageous in that:

firstly it enables the adjustment of the verticality to be modified easily from the surface and during the lifetime of the installation; and secondly operating the chocking means requires (lever) force take-ups that are relatively small.

Preferably, said chocking means comprise a plurality of chocks that are destroyable and/or removable at least in part, so as to enable them to be replaced or modified in order to adjust the angle of inclination $\beta$ of the axis ZZ' of said bottom portion of the pylon relative to the axis $Z_1Z'_1$ of said tubular cavity.

Also preferably, said chocking means are constituted by a plurality of chocks surrounding the outside wall of said pylon bottom portion, preferably being regularly distributed thereabout, said chocks being arranged on a first reinforced peripheral platform surrounding the top end of said tubular cavity, and said chocks occupying all of the space between abutment means and a reinforced outside wall of said pylon bottom portion positioned immediately above said top opening of the tubular cavity, facing said abutment means.

In a variant embodiment, each of said chocks includes at least one machine-welded metal structure that preferably extends over the full height of said chock, said machine-welded structure being suitable for being removed or destroyed.

The term "machine-welded" is used herein to mean that the chock is made from elements made of steel, such as section members, flats, or thick sheets, which elements are welded together.

In another particular variant embodiment, said chocks are made at least in part out of a material that is suitable for in situ casting and molding in the space between said abutment means secured to said first peripheral platform and said reinforced outside wall of said pylon bottom portion.

Also advantageously, said centering means co-operate with support means constituted by reinforced structural elements of the bottom portion of the pylon and reinforced structural elements of the bottom of said tubular cavity, said support elements supporting and transferring the entire weight of said pylon and of said wind engine to the base when said pylon is in a vertical position.

The terms "reinforced structural element" of the bottom portion of the pylon or "reinforced bottom wall" of the tubular cavity are used herein to mean a structural element or a bottom wall having for example thickness that is greater than that of the tubular side wall of the bottom portion of the pylon or of the tubular cavity, preferably thickness that is at least twice the thickness of the tubular side wall of the bottom portion of the pylon or of said tubular cavity, and where appropriate together with additional localized reinforcing elements.

In a preferred embodiment:

said centering means comprise a first centering element secured to a bottom wall of the tubular cavity, placed at the center thereof and co-operating with a second centering element placed at the center of the bottom end of said pylon bottom portion, said first centering element comprises a centering peg extending above said bottom wall of said tubular cavity, or a centering orifice, and co-operates with said second centering element that respectively comprises a centering orifice or a centering peg extending below said bottom end of the pylon, said centering peg being suitable for being inserted in said centering orifice; and said support elements comprise a first support element consisting of a reinforced structure of the bottom end of said bottom portion of the pylon around and above said centering peg or around said centering orifice, as appropriate, and a second support element consisting of a reinforced structure of the bottom wall around and below said centering peg, or around said centering orifice, as appropriate.

Still more particularly, said pylon bottom portion consists of a tubular plug, preferably made of steel, comprising a tubular portion surmounted at its top end by a reinforced plate of outside diameter greater than the diameter of said internal tubular portion of said tubular plug, the underface of said reinforced plate being arranged above a first reinforced peripheral platform surrounding the top opening of the tubular cavity when said tubular plug is fully engaged inside said tubular cavity and a said centering peg and a said centering orifice are co-operating, said top reinforced plate of the tubular plug constituting a fastener flange having fastened thereto a complementary flange secured to the bottom end of a pylon top portion, preferably made of steel, said top reinforced plate of the tubular plug being suitable for coming into lateral abutment against said first reinforced top platform of the tubular cavity in order to take up the forces due to the moment M of the force $F_h$ due to the wind, or due to the angle of inclination of the tubular plug within said tubular cavity, as appropriate.

This embodiment is advantageous since it enables the top end of said tubular plug to have fastened thereto various different types of commercially available pylon that may have a diameter that is slightly smaller than that of the top plate, or indeed of the tubular wall of the tubular plug.

The terms "first reinforced platform" of the tubular cavity or "reinforced plate" of the tubular plug are used to designate a plate presenting, for example, thickness that is greater than the thickness of the tubular side wall of the tubular cavity or of the tubular plug, or preferably thickness that is at least twice the thickness of the tubular side wall of the tubular cavity or of the tubular plug, and, where appropriate, associated with additional localized reinforcing elements.

In an advantageous embodiment, the height of said tubular cavity is not less than the width of a bottom structure including caissons for ballasting said base that is to rest on or to be anchored to the sea bottom, with said tubular cavity rising thereabove over a height H of at least 10 meters (m), preferably 15 m to 25 m in order to have a pylon with a height of at least 50 m, and preferably 50 m to 150 m fixed therein in embedded manner.

More particularly, said base is a gravity base having a plurality of compartments preferably separated by concrete walls forming a substantially rectangular bottom structure surmounted on its top face by a said central tubular cavity that is preferably made of concrete, said tubular cavity being supported by said rectangular bottom structure of the base and being connected thereto by gusset-type reinforcement in the bottom portion of said tubular cavity, said compartments being filled with ballasting means, preferably granulate of high density material such as iron granulate.

Advantageously, said tubular plug is filled at least in part with said granulate for ballasting the various compartments of said gravity base.

In a particular embodiment, the plane bottom bearing surface of said base rests on a stone covering on the sea bottom and is inclined at an angle β of less than 5°, preferably of less than 2°, relative to the horizontal, and the axis ZZ' of said pylon is in a substantially vertical position above sea level and is inclined at a said angle β relative to the axis $Z_1Z'_1$ of said tubular cavity.

Advantageously, said chocking means include actuators, preferably hydraulic jacks secured to the top opening of said tubular cavity and co-operating with the reinforced outside wall of said pylon bottom portion so as to hold said pylon bottom portion in a vertical position.

The present invention also provides a method of adjusting the verticality of a pylon of an off-shore wind turbine, wherein a said pylon bottom portion is engaged inside a said tubular cavity of a base resting on a stone covering on the sea bottom in such a manner that said centering means hold a said point of intersection between the axis ZZ' of said pylon bottom portion and the axis $Z_1Z'_1$ of said tubular cavity in a fixed position at the center of the bottom wall of said tubular cavity, the method being characterized by:

1) installing a plurality of actuators, preferably hydraulic jacks secured to a first peripheral platform at the top end of said tubular cavity projecting above sea level, preferably regularly distributed on said first peripheral platform around said pylon bottom portion, and actuating said actuators, preferably said hydraulic jacks, in such a manner as to position the axis ZZ' of said pylon bottom portion in a vertical position, possibly inclined by an angle β relative to the axis $Z_1Z'_1$ of said tubular cavity; where appropriate; and 2) making said chocking means in situ in the space between the reinforced outside wall of said pylon bottom portion and abutment means secured to said first peripheral platform at the top end of said tubular cavity.

Advantageously, in the method of the invention, the angle of inclination β of the pylon bottom portion inside said tubular cavity is modified by performing the following steps:

1) placing said actuators, preferably hydraulic jacks, on said first peripheral platform, preferably regularly spaced around the pylon bottom portion, and actuating them in such a manner as to hold said pylon in its current position; then 2) removing or destroying at least in part at least some of said chocking means corresponding to a first angle of inclination of said axis ZZ' of said pylon bottom portion relative to the axis $Z_1Z'_1$ of said tubular cavity; and 3) actuating said actuators so as to position the axis ZZ' of said pylon bottom portion at a different angle of inclination β relative to the axis $Z_1Z'_1$ of said tubular cavity, preferably so that said pylon is then in a vertical position; and 4) replacing or modifying said chocking means in such a manner as to occupy all of the space between the outside wall of said pylon bottom portion facing said abutment means secured to said first peripheral platform, the chocking means being of dimensions that are different relative to the initial position, by once more making chocking means in situ.

BRIEF DESCRIPTION OF THE DRAWINGS

Other characteristics and advantages of the present invention appear in the light of the following description that refers to the accompanying drawings showing preferred embodiments of the invention without any limiting character, in which:

FIGS. 5A, 5B, and 5C are plan views corresponding to FIG. 4, showing the device for adjusting the verticality of the wind turbine, said plan view being restricted to the portion of the base that is situated above plane CC' in FIG. 4;

FIG. 6A is a side view in section of the top portion of the socket of the base fitted with two actuators serving to adjust the verticality of the wind turbine;

FIGS. 6B and 6C are plan views corresponding to FIGS. 5B and 5C, in which permanent chocking means lock the pylon of the wind turbine in position;

FIGS. 7A and 7B are plan views showing in situ fabrication of chocks by means of a grout of high-performance cement;

FIGS. 7C and 7D show a variant in the in situ fabrication of chucks that incorporate respective machine-welded structural portions made of steel;

FIG. 7E shows a machine-welded chock made by steel in the form of separable wedges constituting three portions;

FIG. 8 is a vertical section view through a chuck 8;

FIGS. 9A and 9B are side views of a gravity base supporting the pylon of a wind turbine on site, in an initial vertical position (FIG. 9A) and in an inclined position after differential compaction of the ground, with the pylon being readjusted vertically (FIG. 9B); and FIG. 10 is a section view of the installation site showing the sea bottom being covered in stones in such a manner as to create a horizontal platform for having a wind turbine and its gravity base installed thereon.

DETAILED DESCRIPTION OF THE PRESENTLY PREFERRED EMBODIMENTS

Figure 1A:
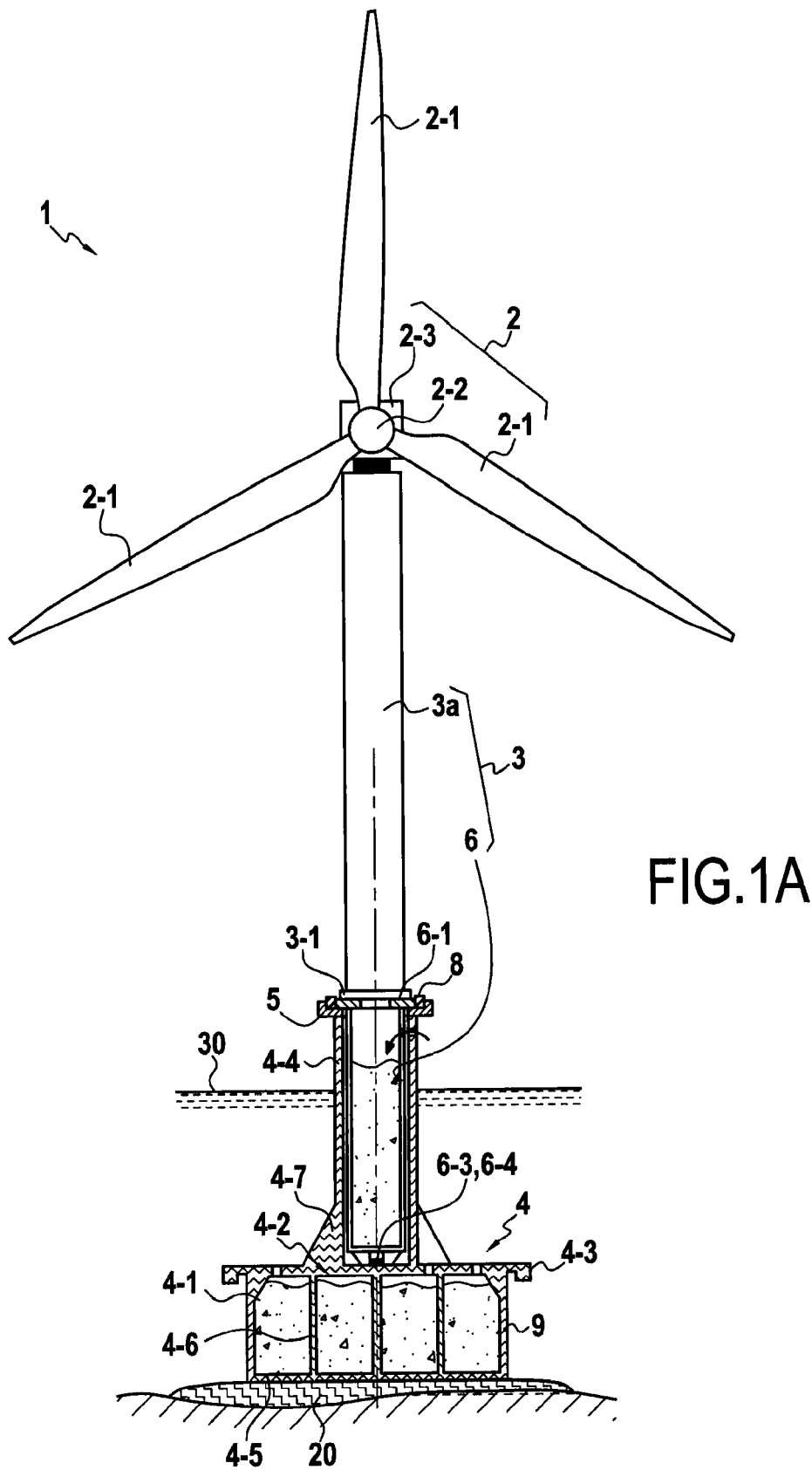
FIG. 1A is a face view of an off-shore wind turbine mounted on a concrete gravity base of the invention, shown in section and resting on the sea bottom.

FIG. 1A is a face view of an off-shore wind turbine 1 comprising a wind engine 2 including an electricity generator 2-3, and a rotor having a horizontal-axis rotary shaft 2-2 driven in rotation by said engine 2 and supporting three blades 2-1 at its end. Said engine 2 is installed at the top of a pylon 3 that is secured to a base 4 of the concrete gravity-base type, which is ballasted after being installed on site by means of iron mineral granulate 9 of specific gravity greater than 4, the granulate being contained between partitions 4-2 of the base 4.

Figure 1B:
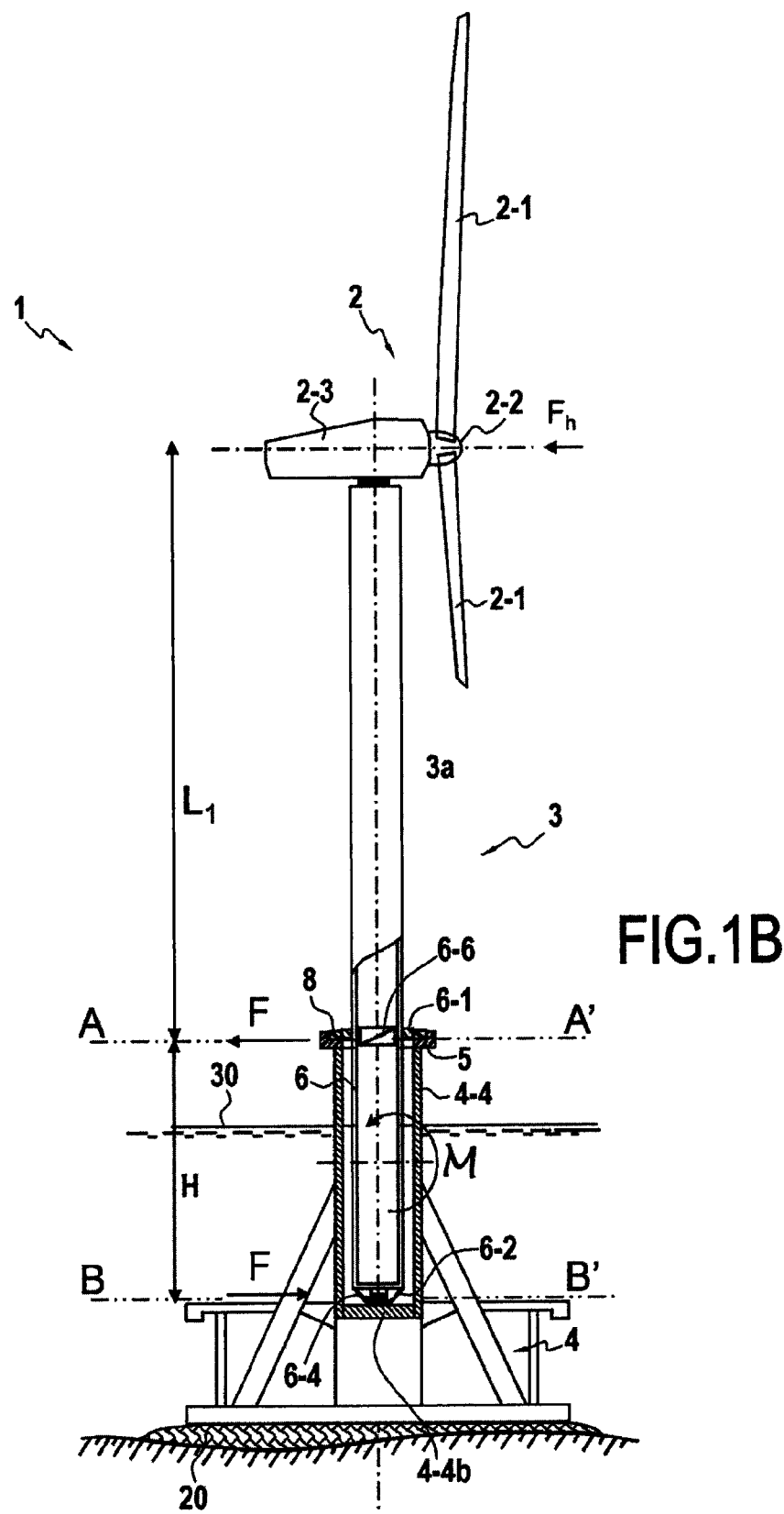
FIG. 1B shows an alternative to FIG. 1A in which the base is a metal structure, the pylon extending downwards in continuity inside the base.

FIG. 1B shows a variant of FIG. 1, in side view, in which the base is constituted by a reinforced metal structure, with the pylon extending downwards inside said base. This figure shows the force $F_h$ generated at the top of the pylon by the wind via the rotor when the generator is producing electricity. This force gives rise to a toppling moment M that needs to be taken up by the base. Because the pylon and the base are two distinct elements, it is appropriate to ensure that said two elements are effectively secured to each other, i.e. fixed in practically embedded manner. To this end, the pylon advantageously extends downwards inside said base and is secured to said base via a centering peg 6-4 situated in the plane BB', and that performs a function that is explained below. At the top of the base, the pylon is rigidly secured to said base in the plane AA' using means that are described in greater detail below. As a result, the moment M gives rise to two forces F in opposite directions in respective ones of the planes AA' and BB'.

Figure 4:
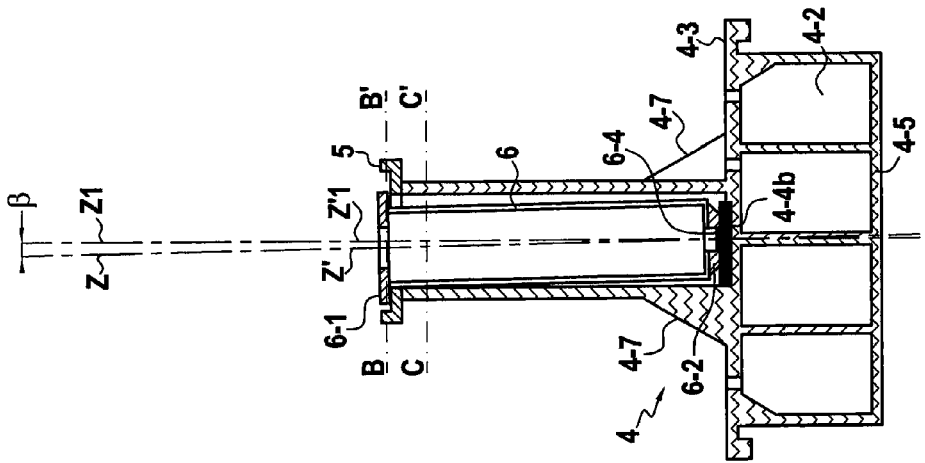
FIG. 4 shows the maximum angular deflection β of the plug in the socket of the base.
Figure 3:
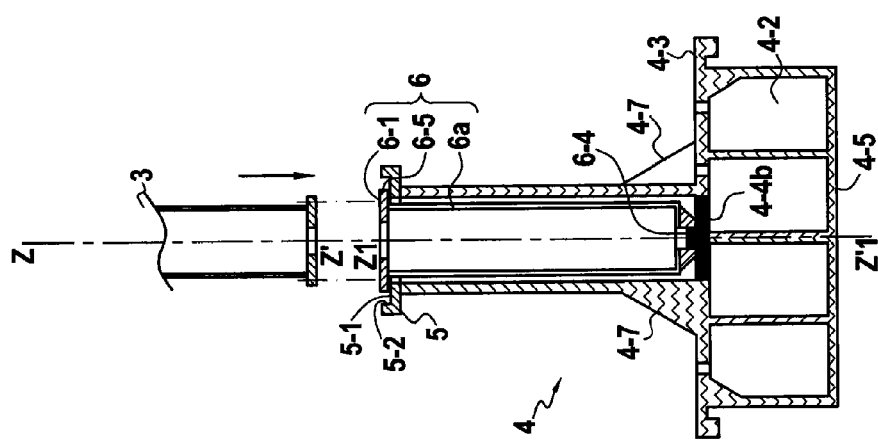
FIG. 3 is a section view showing the pylon being put into place on the axis of the plug, prior to assembly by bolting.
Figure 2:
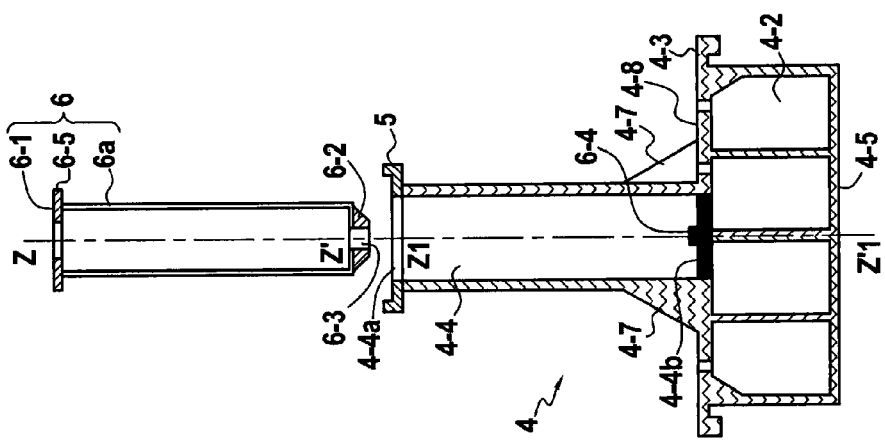
FIG. 2 is a section view of the concrete gravity base through the socket thereof in which a verticality-adjustment plug is inserted, said plug being centered on a peg secured to said base.

FIGS. 1A and 2 are side views in section showing the structure of a concrete base 4. The base is constituted by a structure presenting caissons 4-2 in its bottom portion for filling with ballast in the form of high-density granulate 9. It extends upwards in the form of a well forming a tubular cavity 4-4 of height H extending to just above sea level 30, said well being connected to the bottom portion by gusset-type reinforcement 4-7 and presenting a reinforced peripheral platform 5 at its top portion, preferably constituted by a machine-welded structure, that performs a function that is explained in greater detail in the description below of the invention. The inside of the well 4-4 is preferably circular and receives a tubular plug or socket 6, preferably a thick-walled steel tube 6a of outside diameter preferably corresponding to the thickness and the diameter of the top portion 3a of the pylon 3 of the wind turbine. The bottom portion of the tubular plug includes reinforcement 6-2, preferably made of solid steel, presenting an internal central bore 6-3 that constitutes with a centering peg 6-4 of outside diameter that is slightly smaller than that of the bore and that is secured to the base 4 via the reinforced bottom 4-4b of the well 4-4, i.e. a bottom that presents a thickness that is at least greater than the thickness of the tubular side of the well 4-4, plus, where appropriate, any additional localized reinforcing elements. Thus, while the plug 6 is being inserted in the well 4-4, the foot of the plug is centered on said centering peg 6-3, as shown in FIG. 3. The reinforced structural elements 6-2 at the bottom end of the bottom portion 6 of the pylon 3 and the reinforced bottom wall 4-4b of the tubular cavity 4-4 serve to support and transfer the entire weight of the pylon to the base 4 when the pylon 3 is in the vertical position, as explained below. The top of the tubular plug 6 is secured to a thick reinforced plate 6-1 that is preferably made of steel and that takes up a position close to the plane of the top face 5-1 of said first reinforced peripheral platform 5 around the top opening 4-4a of the tubular cavity 4-4 that comes above the sea level 30, e.g. at a distance of centimeters (cm), and thus without touching it. Furthermore, the outside diameter of the tubular plug 6 is less than the inside diameter of the tubular cavity 4, thus enabling the plug 6 to be deflected sideways together with the pylon 3 through an angle β inside the tubular cavity 4-4 as shown in FIG. 4.

Thus, said reinforced plate 6-1 and said first reinforced peripheral platform 5 enable the forces due to the toppling moment M to be transferred to the base by acting in the plane AA' when the wind turbine is subjected to the force $F_h$ due to the wind.

FIG. 1A shows a wind turbine pylon 3 constituted by a pylon top portion 3a fastened to a pylon bottom portion 3 that is constituted by a tubular plug 6. More precisely, a plate 3-1 secured to the bottom end of the top portion 3a of the pylon is fastened on a top plate 6-1 secured to the top end of the tubular plug 6.

FIG. 1B shows a variant embodiment in which the tubular plug 6 constitutes a pylon bottom portion that is continuous with the top portion 3a and that is distinguished therefrom by said plate 6-1 that is placed above said first reinforced peripheral platform 5 of the tubular cavity 4-4 of the base 4 that is located above sea level 30, or where appropriate that comes into lateral abutment thereagainst.

More precisely, FIG. 1B is a fragmentary section view of a wind turbine having its pylon extending downwards so as to reach the level of the plane BB' of the base. The bottom portion of said pylon includes said reinforcement 6-2 that presents an internal bore 6-3 co-operating with the centering peg 6-4 secured to the base and projecting above the center of the reinforced bottom wall 4-4b of the tubular cavity 4-4. Thus, the bottom portion 6 of the pylon 3 extending between the top planes AA' and BB' acts as the plug, and furthermore, at the level of the plane AA', the pylon is locally reinforced by an outer ferrule acting as the plate 6-1 located above the first peripheral platform 5 of the tubular cavity 4-4, and where appropriate by internal reinforcement 6-6, the assembly comprising the reinforced plate 6-1, the inner reinforcement 6-10, and the first reinforced platform 5 serving to transmit to the base forces that are due to the moment M of the force $F_h$ due to the wind, or as a result of the pylon having an angle of inclination, as described below.

The installation site is generally prepared in known manner by being covered in stone 20 in controlled manner from a surface ship, as shown in FIG. 10. For this purpose, a bulk-carrier type ship 10 that preferably includes dynamic positioning is fitted on its side with a hopper 11 connected to a lightweight pipe 12 that extends downwards to within 1 m to 2 m from the sea bottom. A device 13 fitted with lateral thrusters 14 and a video camera (not shown) serves to move the bottom end of said pipe 12 in all directions over a few meters so as to adjust accurately the zone to which the granulate 16 is directed. Said granulate is loaded into the hopper 11 by the crane 17, and then runs down the pipe 12 so as to end up being placed on the foundation 20. The stone-covering process is monitored from on board the ship by side scan sonar 15, known to the person skilled in the art, and giving a very accurate representation of the stone-covered surface. With such means, it is possible to create stone-covered platforms having a thickness of several meters and presenting a surface area that can be much greater than 1000 square meters ($m^2$), and in which the maximum variations of the top level lie within the range 0.2 m to 0.5 m. It is thus possible to consider that the base when installed on the stone-covered foundation is substantially horizontal, however the installation proper of the base and the ballasting thereof with heavy granulate will inevitably lead to a small amount of depression that may differ between the right portion and the left portion. As a result, the axis ZZ' of the base is then no longer exactly vertical, where that is harmful to proper long-term operation of the wind turbine, and more particularly to swiveling the rotor head turret relative to the pylon.

Thus, once the base 4 has been installed on site, as shown in FIG. 1, it presents some given angle β, e.g. 0.5 degrees) (°), relative to the vertical, so it is appropriate to finish off installation by restoring the wind turbine pylon to have an axis that is accurately vertical. For this purpose, and as shown in FIGS. 5A, 5B, and 5C, a plurality of actuators, preferably hydraulic jacks 7 secured to the ring 5-3 of the reinforced platform 5, are advantageously installed, preferably in pairs symmetrically about the axis ZZ' of the wind turbine. The cylinder 7-1 of a jack is secured to the ring 5-3 while the rod 7-2 of said jack comes into contact with the side wall of the thick plate 6-1.

In FIG. 5A, the tubular plug 6 had not yet been installed, and the actuators 7c-7d are at half-stroke. The rod of the actuator 7a is fully retracted while the rod of the actuator 7b is fully extended. It can thus be understood, as shown in detail in FIG. 5C, that by increasing (reducing) the length of the rod of an actuator, the tubular plug 6, and thus the entire wind turbine, can be caused to tilt in the direction of said increase in length: naturally, the length of the opposite actuator is compensated by reducing (increasing) its length in substantially identical manner. Thus, in FIG. 5C, the rods of the actuators 7b and 7d are extended, while the rods of the opposite actuators 7a and 7c are retracted, so as to tilt the pylon in the northwest direction through an angle corresponding substantially to the maximum angle β of FIG. 4.

FIG. 5B shows the pylon of the wind turbine on the axis of the well in the base, with the assembly being held in position solely by the above-described actuators.

FIG. 6A is a side view in section corresponding to FIG. 5A showing in greater detail the positions of the actuators 7a and 7b secured to the ring 5-3 of the reinforced platform 5.

Once the verticality of the axis ZZ' of the wind turbine has been adjusted by adjusting the angle of inclination of the axis ZZ' of the pylon 3 relative to the axis $Z_1Z'_1$ of the tubular cavity 4-4 in the base 4, permanent chocking means are advantageously put into place so that the lateral toppling forces due to the wind or to storms acting on the wind turbine and its pylon are transmitted by the reinforced plate 6-1 to said first reinforced platform 5 and then to the base proper. Throughout this stage of installing chocking means, the actuators are locked in position so that the pylon does not move at all.

In a preferred version of the invention, the chocks 8 are merely cast into a simplified mold constituted by a wooden wall of the kind used for shuttering or formwork in construction, and as shown in detail in FIGS. 7A-7B-7C-7D, which relate to fabricating the chock 8 of FIG. 6C.

FIGS. 7A to 7D are plan views from above showing the vertical inside wall 5-2 of the ring 5-3 of the reinforced platform 5 together with the outside wall 6-5 of the thick platform 6-1 situated at the top of the plug 6. A bottom of shuttering 8-3 is installed preferably in direct contact with the top portion 5-1 of said first reinforced platform 5, together with two lateral shuttering elements 8-1 connecting the inside vertical wall 5-2 of the ring 5-3 to the outside wall 6-5 of the thick plate 6-1, and also connected to the bottom shuttering, thereby creating a cup of height substantially equal to the height of said walls 5-2 and 6-5. A grout of material such as concrete is then cast into the volume of the cup as formed in this way so as to constitute a chock 8 that is molded in situ and that presents no slack relative to the vertical walls, respectively the inside wall 5-2 of the ring 5-3 of said first reinforced platform 5, and the outside wall 6-5 of the thick plate 6-1. By making each of the other chocks in the same manner, which chocks are preferably uniform and distributed around the periphery of the thick plate 6-5 of the plug 6, said plug and thus the wind turbine pylon 3 is fixed in embedded manner in its base. By means of this adjustment that is performed at the end of installation using the device of the invention, the wind turbine is accurately vertical even though its base is positioned with a certain amount of uncertainty concerning the verticality of its axis ZZ' while it is being installed.

In order to provide good chocking, it is advantageous to use a very high performance non-shrink grout of the cement grout type, such as Embeco 880 from the supplier BASF, that presents excellent compression strength within 24 hours after casting and that presents practically no creep or shrinkage over time.

Once the chocks have set sufficiently, either the actuators are left in place in a locked position as shown in FIG. 6B (actuators 7c and 7d), or else they are left in a retracted position (actuator 7a), or else they are removed as represented by the missing actuator 7b.

While the wind turbine is in operation, which may continue for 20 to 25 years or even more, there is a risk of the ground under the base of the wind turbine suffering differential compaction, thereby shifting the axis of the wind turbine pylon away from the vertical. In order to return to the vertical position, it is then advantageous to use the device of the invention to perform an operation of returning to the vertical position that is then performed by implementing the following steps:

1) the actuators 7 are replaced on the ring 5-3 of said first reinforced platform 5; then
2) the rods 7-2 are extended from said actuators 7, 7a-7d so that they come into contact with the thick plate 6-5 of the plug 6; then
3) the actuators are locked in the extended position so as to hold the pylon firmly; then
4) each of the chocks 8 is removed or destroyed; then
5) the verticality of the wind turbine is readjusted by acting on the lengths of rod 7-2 extended from each of the actuators, as explained above; and then
6) a new set of chocks is reinstalled, in the manner explained above.

Removing the chocks 8 as defined above with reference to FIGS. 7A and 7B may present a certain amount of difficulty because of the extreme hardness of said grout once it has set. Thus, in a preferred version shown in detail in FIGS. 7C and 7D, using the same shuttering as used in FIG. 7A, it is advantageous prior to casting the grout, to install a breakable intermediate structure 8-2, e.g. a machine-welded metal structure, that extends over the full height of said cup, interconnecting the side elements of the shuttering 8-1, so as to define two complementary chocks 8a and 8b that are independent of each other. Thus, the horizontal forces pass from said reinforced plate 6-1 to the half-chock 8b, then to the intermediate structure 8-2, then to the half-chock 8a, and finally to the inside side wall 5-2 of the ring of said first reinforced platform 5. Thus, if it subsequently becomes necessary to adjust the verticality of the wind turbine, it suffices to cut through said intermediate structure 8-2 along MM', e.g. using an oxyacetylene cutting torch, which can generally be done easily and quickly, so as to release the stresses between the chocks, thereby enabling them to be removed and extracted easily.

FIG. 7E shows a chock made up of three wedge-shaped parts 8a, 8-2, and 8b that are mounted in a self-locking manner, such that once they are assembled together they have a shape that is identical to the machine-welded chock 8. During removal, it then suffices to extract the inner chock by moving it in axial translation by means of appropriate devices such as a high power hydraulically-actuated extractor.

Other removable chocking means may be envisaged, but under all circumstances it is advantageous for them to be used in association with the method of in situ casting a grout as described above, said in situ casting method being implemented at the interface between the prefabricated chock and firstly the side wall 6-5 of said thick reinforced plate 6-1, and secondly the inside wall 5-2 of the ring of said first reinforced platform 5.

The device of the invention as described above with reference to FIGS. 1A, 2, 3, 4, and 9 is applicable to a conventional wind turbine in which the base is fitted with a thick flange welded or bolted to its foundation plate.

In order to clarify the explanations and the drawings, the tubular elements relating to the pylon and to the plug are shown as being circular in shape, and the reinforced platform at the top of the base is shown as being polygonal in shape, however any polygonal, circular, or elliptical shape may be envisaged for these various elements. Nevertheless, when using circular shapes, care should be taken to provide chocks that are capable of taking up twisting forces about the vertical axis ZZ', which is easily achieved when using chocks that have been cast in situ by incorporating protuberances in the vertical walls 5-2 and 6-5, e.g. welded pieces of steel section member, that, once embedded in the grout, act as connectors and thereby provide the assembly with stiffness in twisting about the axis ZZ'.

By way of illustration, the wind turbine of the invention comprises a pylon having a height of 5 m to 150 m, preferably at a height of at least 100 m, with its tubular wall presenting a diameter of more than 2 m to 10 m, and more particularly lying in the range 6 m to 7 m. The base comprises a rectangular box structure 4-1 of square section with a side of at least 20 m, preferably at least 30 m and with a height of 10 m that is partitioned by partitions 4-6 constituted by a thickness of 20 cm to 30 cm of concrete, so as to form compartments 4-2 that are separated by vertical partitions 4-6. The tubular cavity 4-4 rises to a height H above the top face 4-8 of the rectangular structure 4-1 of the base 4, substantially in the center thereof, where the height H lies in the range 15 m to 25 m. The inside diameter of the tubular cavity 4-4 is greater than the outside diameter of the tubular plug 6 and of the pylon 3, generally at least 1 m and preferably 2 m greater, these dimensions enabling the tubular plug that is fastened at its bottom end to the centering peg 6-4 to pivot in a cone having a half-angle at the apex β that may be as much as 2°, and that preferably lies in the range 1° to 1.5°. The centering peg 6-4 is constituted by a cylindrical stud having a diameter of at least 0.5 m to 1 m, and extending over a height of at least 0.5 m to 1 m, likewise. The base in this example rests at a depth of 20 m to 30 m, such that said tubular cavity projects by about 5 m above sea level 30.

By way of example, the off-shore wind turbine is constituted by a generator engine that weighs 300 t to 500 t and has a pylon with a diameter of 6 m and a height lying in the range approximately 90 m to 120 m, that weighs about 300 t to 400 t.

This embedding structure enables forces $F_h$ to be taken up that may be as great as 100 t, or even 200 t, thereby creating a toppling moment M that is resolved into two opposite-direction forces F in respective ones of the planes AA' and BB' of at least 1000 t to 2000 t.

In the present description, a male centering peg 6-4 is described that is secured to the bottom of the tubular cavity of the base and that co-operates with a female internal central bore 6-3 of reinforcement 6-2 situated in the bottom end of the tubular plug 6, however it would remain within the spirit of the invention for said element to be inverted, i.e. for the male peg to be secured to said reinforcement 6-2 of the tubular plug, with the female bore being incorporated in reinforcement secured to the bottom of the tubular cavity of the base, these two elements then co-operating in identical manner.

The invention claimed is:

1. An off-shore wind turbine resting on the sea bottom, the wind turbine comprising:
   a base having a bottom bearing surface bearing against the ground of the sea bottom; and
   a pylon supported by said base, the bottom end of the pylon being fixed in embedded manner in said base; and
   a wind engine supported by said pylon at its top end and comprising a rotary shaft of horizontal axis driven in rotation by an engine and supporting a plurality of blades with said wind engine being coupled to an electricity generator; and
   said base includes a tubular cavity, a bottom portion of said pylon being fixed inside said tubular cavity, the fixing being performed by means of a device for adjusting the angle of inclination of the axis of said pylon to be adjusted relative to the axis of said tubular cavity;
   wherein said device for adjusting the angle of inclination of said pylon in said base comprises:
   a) independent chocking means interposed between said pylon bottom portion and said tubular cavity at the level of the top opening of said tubular cavity projecting above sea level; and
   b) centering means secured to said pylon bottom portion and to said tubular cavity, said centering means being situated inside said tubular cavity beneath said chocking means, and said centering means comprising a first centering element secured to a bottom wall of said tubular cavity, located at the center thereof and co-operating with a second centering element located at the center of the bottom end of said pylon bottom portion, said centering means being suitable for holding the point of intersection between the axis of said pylon bottom portion and the axis of said tubular cavity in a fixed position at the bottom of said tubular cavity.

2. The off-shore wind turbine according to claim 1, wherein said chocking means comprise a plurality of chocks that are destroyable and/or removable at least in part, so as to enable them to be replaced or modified in order to adjust the angle of inclination β of the axis of said bottom portion of the pylon relative to the axis of said tubular cavity.

3. The off-shore wind turbine according to claim 2, wherein each of said chocks includes at least one machine-welded metal structure, said machine-welded structure being suitable for being removed or destroyed.

4. The off-shore wind turbine according to claim 1, wherein said chocking means are constituted by a plurality of chocks surrounding the outside wall of said pylon bottom portion, being distributed thereabout, said chocks being arranged on a first reinforced peripheral platform surrounding the top end of said tubular cavity, and said chocks occupying all of the space between abutment means and a reinforced outside wall of said pylon bottom portion positioned immediately above said top opening of the tubular cavity, facing said abutment means.

5. The off-shore wind turbine according to claim 4, wherein said chocks are made at least in part out of a material that is suitable for in situ casting and molding in the space between said abutment means secured to said first peripheral platform and said reinforced outside wall of said pylon bottom portion.

6. The off-shore wind turbine according to claim 1, wherein said centering means co-operate with support means constituted by reinforced structural elements of the bottom portion of the pylon and reinforced structural elements of the bottom of said tubular cavity, said support elements supporting and transferring the entire weight of said pylon and of said wind engine to the base when said pylon is in a vertical position.

7. The off-shore wind turbine according to claim 6, wherein:
   said first centering element comprises a centering peg extending above said bottom wall of said tubular cavity, or a centering orifice, and co-operates with said second centering element that respectively comprises a centering orifice or a centering peg extending below said bottom end of the pylon, said centering peg being suitable for being inserted in said centering orifice; and
   said support elements comprise a first support element consisting of a reinforced structure of the bottom end of said bottom portion of the pylon around and above said centering peg or around said centering orifice, as appropriate, and a second support element consisting of a reinforced structure of the bottom wall around and below said centering peg, or around said centering orifice, as appropriate.

8. The off-shore wind turbine according to claim 6, wherein said pylon bottom portion consists of a tubular plug, comprising a tubular portion surmounted at its top end by a reinforced plate of outside diameter greater than the diameter of said tubular portion of said tubular plug, the underface of said reinforced plate being arranged above a first reinforced peripheral platform surrounding the top opening of the tubular cavity when said tubular plug is fully engaged inside said tubular cavity and a said centering peg and a said centering orifice are co-operating, said top reinforced plate of the tubular plug constituting a fastener flange having fastened thereto a complementary flange secured to the bottom end of a pylon top portion, said top reinforced plate of the tubular plug being suitable for coming into lateral abutment against said first reinforced top platform of the tubular cavity in order to take up the forces due to the moment of the force due to the wind, or due to the angle of inclination of the tubular plug within said tubular cavity, as appropriate.

9. The off-shore wind turbine according to claim 1, wherein the height of said tubular cavity is not less than the width of a bottom structure including caissons for ballasting said base that is to rest on or to be anchored to the sea bottom, with said tubular cavity rising thereabove over a height H of at least 10 m in order to have a pylon with a height of at least 50 m fixed therein in embedded manner.

10. The off-shore wind turbine according to claim 9, wherein said base is a gravity base having a plurality of compartments separated by concrete walls forming a substantially rectangular bottom structure surmounted on its top face by said tubular cavity that is made of concrete, said tubular cavity being supported by said rectangular bottom structure of the base and being connected thereto by gusset-type reinforcement in the bottom portion of said tubular cavity, said compartments being filled with ballasting means comprising granulate of high density material such as iron granulate, and 11. The off-shore wind turbine according to claim 1, wherein said base is a gravity base having a plurality of compartments forming a substantially rectangular bottom structure surmounted on its top face by said tubular cavity, said tubular cavity being supported by said rectangular bottom structure of the base and being connected thereto by gusset-type reinforcement in the bottom portion of said tubular cavity, said compartments being filled with ballasting means. wherein said tubular plug is filled at least in part with said granulate for ballasting the various compartments of said gravity base.

12. The off-shore wind turbine according to claim 1, wherein the plane bottom bearing surface of said base rests on a stone covering on the sea bottom and is inclined at an angle β of less than 5° relative to the horizontal, and the axis of said pylon is in a substantially vertical position above sea level and is inclined at a said angle β relative to the axis of said tubular cavity.

13. The off-shore wind turbine according to claim 1, wherein said chocking means include actuators secured to the top opening of said tubular cavity and co-operating with the reinforced outside wall of said pylon bottom portion so as to hold said pylon bottom portion in a vertical position.

14. A method of adjusting the verticality of a pylon of an off-shore wind turbine according to claim 1, wherein a said pylon bottom portion is engaged inside a said tubular cavity of a base resting on a stone covering on the sea bottom in such a manner that said centering means hold a said point of intersection between the axis of said pylon bottom portion and the axis of said tubular cavity in a fixed position at the center of the bottom wall of said tubular cavity, the method comprising:
1) installing a plurality of actuators secured to a first peripheral platform at the top end of said tubular cavity projecting above sea level, distributed on said first peripheral platform around said pylon bottom portion, and actuating said actuators in such a manner as to position the axis of said pylon bottom portion in a vertical position, possibly inclined by an angle β relative to the axis of said tubular cavity; where appropriate; and
2) making said chocking means in situ in the space between the reinforced outside wall of said pylon bottom portion and abutment means secured to said first peripheral platform at the top end of said tubular cavity.

15. A method according to claim 14, wherein the angle of inclination β of said pylon bottom portion inside said tubular cavity is modified by performing the following steps:
1) placing said actuators, comprising hydraulic jacks, on said first peripheral platform regularly spaced around the pylon bottom portion, and actuating them in such a manner as to hold said pylon in its current position; then
2) removing or destroying at least in part at least some of said chocking means corresponding to a first angle of inclination of said axis of said pylon bottom portion relative to the axis of said tubular cavity; and
3) actuating said actuators so as to position the axis of said pylon bottom portion at a different angle of inclination β relative to the axis of said tubular cavity, so that said pylon is then in a vertical position; and
4) replacing or modifying said chocking means in such a manner as to occupy all of the space between the outside wall of said pylon bottom portion facing said abutment means secured to said first peripheral platform, the chocking means being of dimensions that are different relative to the initial position, by once more making chocking means in situ.

\* \* \* \* \*